US012726111B2

(12) United States Patent
Doyon et al.

(10) Patent No.: US 12,726,111 B2
(45) Date of Patent: Sep. 1, 2026

(54) RAPID AND PRECISE HIGH FREQUENCY INVERTER INITIALIZATION PROCESS FOR INDUCTION HEATING SYSTEMS

(71) Applicant: Inductoheat, Inc., Madison Heights, MI (US)

(72) Inventors: Gary A. Doyon, Grosse Pointe Farms, MI (US); Michael A. Nallen, Ware, MA (US); Randall J. Minnick, Lake Orion, MI (US); Elik Dvorkin, Woodbridge, CT (US)

(73) Assignee: INDUCTOHEAT, INC., Madison Heights, MI (US)

( * ) Notice: Subject to any disclaimer, the term of this patent is extended or adjusted under 35 U.S.C. 154(b) by 203 days.

(21) Appl. No.: 18/903,463

(22) Filed: Oct. 1, 2024

(65) Prior Publication Data

US 2025/0125718 A1 Apr. 17, 2025

Related U.S. Application Data

(60) Provisional application No. 63/543,589, filed on Oct. 11, 2023.

(51) Int. Cl.
*H02M 1/36* (2007.01)
*H02M 7/48* (2007.01)
(Continued)

(52) U.S. Cl.
CPC ........... *H02M 1/36* (2013.01); *H02M 7/4815* (2021.05); *H05B 6/04* (2013.01); *H05B 6/06* (2013.01)

(58) Field of Classification Search
CPC ...... H02M 1/36; H02M 1/007; H02M 1/0025; H02M 7/4815; H05B 6/04; H05B 6/06; H05B 6/101
See application file for complete search history.

(56) References Cited

U.S. PATENT DOCUMENTS 3,932,741 A * 1/1976 Hanson .................. H03K 4/066 327/133
4,289,946 A * 9/1981 Yarwood ................ H05B 6/067 219/602

(Continued)

FOREIGN PATENT DOCUMENTS

CN 113972849 A * 1/2022 ............... H05B 6/06
JP 2015076145 A 4/2015
JP 2019103202 A * 6/2019

OTHER PUBLICATIONS

Machine Translation CN-113972849-A (Year: 2022).*
Machine Translation JP-2019103202-A (Year: 2019).*

*Primary Examiner* — Thienvu V Tran
*Assistant Examiner* — Yahveh Comas Torres
(74) *Attorney, Agent, or Firm* — Robert J. Everling

(57) ABSTRACT

A method and system are provided for initializing a high frequency inverter in an induction heating system, to minimize the startup time and ramp-up time to a target power level of the induction heating system for precise heat distribution control in a workpiece. The system and method utilize initial inverter control frequencies approximately equivalent to a resonant frequency of the resonant circuit which varies relative to discrete sample to sample variations in the associated workpiece. The power supply control is then initialized at an initial power level substantially lower than the target power level associated with the workpiece to be heated until a phase-locked loop is locked to the actual resonant frequency, at which point the power supply rapidly increases power the target power level for the particular induction heat treatment application.

20 Claims, 6 Drawing Sheets

(51) Int. Cl.
*H05B 6/04* (2006.01)
*H05B 6/06* (2006.01)

(56) References Cited

U.S. PATENT DOCUMENTS

| | | | | |
|---|---|---|---|---|
| 6,326,740 | B1 * | 12/2001 | Chang | H05B 41/3925 315/194 |
| 7,291,817 | B2 * | 11/2007 | Weiss | H05B 6/40 219/653 |
| 7,358,467 | B2 * | 4/2008 | Yang | H05B 6/04 219/662 |
| 7,772,530 | B2 * | 8/2010 | Weiss | H05B 6/08 219/666 |
| 9,167,632 | B2 * | 10/2015 | Weiss | H05B 6/101 |
| 10,138,531 | B2 * | 11/2018 | Ito | C21D 11/00 |
| 2006/0091136 | A1 * | 5/2006 | Weiss | H05B 6/101 219/666 |
| 2006/0290295 | A1 * | 12/2006 | Yang | H05B 6/04 315/274 |
| 2024/0408691 | A1 * | 12/2024 | Dvorkin | B23K 13/08 |

* cited by examiner

RAPID AND PRECISE HIGH FREQUENCY INVERTER INITIALIZATION PROCESS FOR INDUCTION HEATING SYSTEMS

CROSS-REFERENCE TO RELATED APPLICATIONS

This application claims the benefit of U.S. Provisional Application No. 63/543,589, filed on Oct. 11, 2023, hereby incorporated by reference in its entirety.

FIELD OF THE INVENTION

The present invention relates to a system and method for minimizing startup time of a high frequency inverter utilized in induction heating systems. More particularly, the present invention reduces overall operation time at non-resonant frequencies of the resonant circuit to precisely control heat distribution within an associated workpiece.

BACKGROUND OF THE INVENTION

Induction heating can be used to heat treat a variety of workpieces via inducing an electric current in an associated workpiece. Heat distribution within the workpiece can be controlled by variation of several induction heating system parameters, including frequency, power level, time within the flux field, induction coil geometry, and position of the workpiece within the coil. Particularly, as the depth of penetration of the induced current is controlled in part by the frequency, high frequency applications of induction heating can be utilized to harden the external surfaces of the workpiece while retaining a softer core, increasing wear resistance, fatigue resistance, and yield strength of the workpiece. Improperly controlling the heat distribution through the workpiece, however, can produce less wear resistance than intended as well as introduce additional flaws, such as cracking or distortion of the workpiece, which may make the workpiece unsuitable for its intended purpose.

However, high frequency inverters require a ramp-up time to produce a desired power level to the load. In some applications, this ramp-up time represents a substantial portion of the total time the workpiece is being heated, resulting in much of the heating being performed at suboptimal power levels, negatively impacting the overall temperature and heat distribution through the workpiece. For example, one type of phase lock field effect transistor (FET) based power supply has a typical ramp-up time of 400-500 milliseconds. During this ramp-up time, the inverter cannot start and run in a stable condition at less than 10-20% power. Therefore, during this ramp-up time, 10-20% of power is being applied to the load (workpiece to be heat treated). Another type of power supply has insulated-gate bipolar transistor (IGBT) based power modules. This type of inverter adjusts power by sweeping the frequency. The power ramp-up speed is thus a function of how fast the frequency can be swept from the high limit down to the lower limit. The expected ramp down in frequency from the high frequency limit to the low frequency limit is three time constants for stable operation. By way of example, for one type of IGBT based inverter, one time constant is 49.9 kΩ2*11 uF, or 0.549 seconds. Thus, the expected sweep time to reach full power is three times the above number, or 1.65 seconds. Therefore, typical ramp-up times in the industry for existing IGBT and FET power inverters range from 400 milliseconds to 1.65 seconds. This amount of ramp-up time may represent a substantial proportion of total heating time in some applications. For example, one potential workpiece frequently heat treated is a gear which presents particular geometry. In many gear hardening applications, the specified heat treat pattern is to have a profiled hardening pattern. This means that the case depth of hardened areas (shown in the associated figures as darkened areas) matches the contour shape of the gear teeth as illustrated in FIG. 1(*a*). As shown, an ideal hardening pattern comprises a contoured hardening pattern of substantially uniform case depth across the exterior of the workpiece geometry. An uninterrupted hardened pattern on all contact areas of each tooth of the exemplary gear indicates improved wear resistance properties of the gear while also ensuring uninterrupted distribution of compressive stresses experienced at the gear surface. Retention of a ductile core of the tooth provides substantial benefits to gear properties, such as improved wear resistance, toughness, bending strength, and durability.

Typical total heating time for profiled gear hardening can be as short as 0.500 seconds (500 milliseconds) and no more than 1.0 second. If the previously mentioned power supplies are used with ramp-up times of 400 milliseconds to 1.65 seconds, the time to obtain full power may exceed the total heat time. During this extended ramp-up time, undesired low power is being applied to the workpiece, putting energy into the workpiece, which has adverse effects on obtaining the profiled hardened case depth. Depending on the workpiece geometry, this undesired low power may result in a variety of non-profiled hardened case depths as shown in FIGS. 1(*b*) through 1(*e*). As illustrated, the undesired hardening patterns fail to properly follow the profile of the workpiece entirely, have non-uniform case depth penetration, and otherwise weaken the individual components of the workpiece by introducing improperly heat-treated areas along the profile of the workpiece. Specifically, FIG. 1(*b*) illustrates an example of flank hardening, wherein the flank of each tooth in the exemplary gear is hardened, however a distal end or fillet of the tooth is not hardened. This results in improved wear resistance, however typically failures occur as a result of bending fatigue caused by repeated loading leading to cracks in the fillet area. Alternatively, FIG. 1(*c*) illustrates an example of flank and tooth hardening, where an interior of each tooth of the exemplary gear is hardened in addition to the flanks, while the fillet and roots of the gear remain substantially unaffected by the heat treatment. Such hardening patterns provide increased wear resistance, however they suffer from similar drawbacks as the flank hardening pattern illustrated in FIG. 1(*b*), wherein load carrying capacity is poor, resulting in failures along the fillet of the tooth. FIG. 1(*d*) illustrates an example of tip hardening, wherein only a fillet region of the teeth of the exemplary gear are hardened. As the root and flanks remain untreated, bending fatigue strength of gears with this heating pattern is drastically reduced, however as minimal heat treatment is applied to key areas, shape distortion of the gear is minimized. Finally, FIG. 1(*e*) shows an example of root hardening, wherein the roots disposed at the base of each tooth of the exemplary gear are hardened while the flanks and fillets remain untreated. While such a heat distribution reinforces the root, shifting residual stresses away from the root and fillet surfaces results in non-complementary tensile stresses during service often resulting in bending fatigue fracture. Furthermore, wear resistance is reduced as the flanks remain untreated, resulting in removal or displacement of metal particles from the gear surface.

Furthermore, it is preferable to operate an induction heating system at the resonant frequency of the resonant circuit, as the current drawn by the resonant tank and the work coil are equal in magnitude, and opposite in phase, thereby ensuring that all current drawn from the power supply contributes to heating of the workpiece. However, each workpiece is part of the resonant circuit, and therefore discrete workpieces introduce variation to the resonant frequency of the resonant circuit due to sample-to-sample differences, such as magnetic permeability, geometric tolerances, and variations in positioning. As such, failing to correct for variations in resonant frequency between workpieces can further reduce efficiency and precision of induction heating. For this reason, in applications that are short duration in nature, it is imperative to both provide a fast ramp-up time and to achieve the correct resonant frequency.

One object of the present invention is to provide a system and method for rapid initialization of an inverter of an induction heating system to dynamically provide precise heating of a workpiece at the resonant frequency, such that the heat distribution through the workpiece is precisely controlled to limit distortion and cracking.

BRIEF SUMMARY OF THE INVENTION

In one aspect the present invention is an induction heating control system for minimizing the initialization time required for a high frequency inverter. A power supply is operably connected to a high frequency inverter, which is in turn connected to a load coil configured to induce an electrical current in a workpiece. The power supply receives an alternating current (AC) voltage and outputs direct current (DC) voltage to an inverter power stage of the inverter. The inverter power stage inverts the DC voltage to a high frequency AC voltage output to a resonant tank of the inverter. The resonant tank, in combination with the load coil and the workpiece, form a resonant circuit having a resonant frequency at which maximum power is delivered to the workpiece. The inverter further comprises a phase-locked loop (PLL) controller which receives a feedback signal from the resonant tank, the feedback signal returning the voltage of the resonant tank for phase measurement and adjustment. The phase-locked loop controller sends firing signals to the inverter power stage to set the phase and frequency of the inverter switching. Once the PLL controller determines that the inverter is operating at the resonant frequency, a synchronization signal is sent to the power supply, at which point the power level produced by the power supply is increased to operating levels. In this manner, the system is configured to dynamically adjust to variations in resonant frequency caused by inevitable variations between discrete workpieces in the resonant circuit.

In another aspect, the present invention is a method for minimizing the initialization time required for a high frequency inverter. An initial inverter frequency is selected, wherein the initial inverter frequency is approximately equivalent to an expected resonant frequency of the resonant circuit. A power supply is initialized at an initial power level, wherein the initial power level is minimal relative to a target power level, for example 6% of the target power level. A phase-locked loop regulation process is initialized once the power supply reaches the initial power level and sufficient feedback is received from the resonant tank until the phase-locked loop regulation process settles on the resonant frequency. The power level produced by the power supply is then increased to the target power level.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification.

FIG. 1(*b*) illustrates a non-ideal non-profiled heat treatment pattern for a workpiece having complex geometry.

FIG. 1(*c*) illustrates a non-ideal non-profiled heat treatment pattern for a workpiece having complex geometry.

FIG. 1(*d*) illustrates a non-ideal non-profiled heat treatment pattern for a workpiece having complex geometry.

FIG. 1(*e*) illustrates a non-ideal non-profiled heat treatment pattern for a workpiece having complex geometry.

FIG. 3(*b*) illustrates a partial flow diagram representative of one embodiment of the high-frequency inverter initialization process for induction heating applications.

DETAILED DESCRIPTION OF THE INVENTION

For the purposes of this disclosure, "high frequency" means frequencies greater than 100 kHz, "low power" means power levels below 25% of a target power level, and "approximately equivalent" means frequencies within +5 kHz.

Figures 1A, 1B, 1C, 1D, 1E:
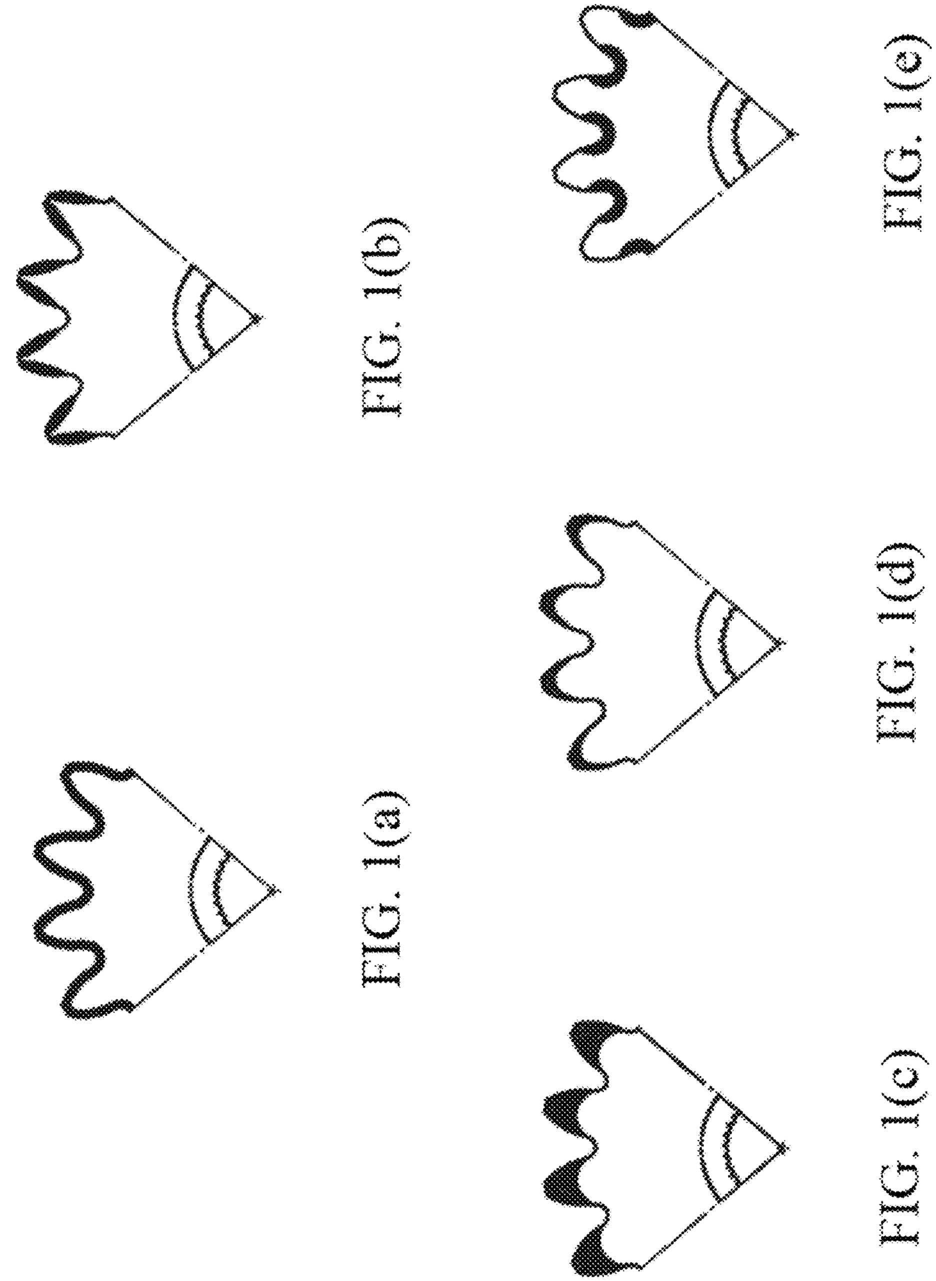
FIG. 1(*a*) illustrates an ideal profiled heat treatment pattern for a workpiece having complex geometry.
Figure 2:
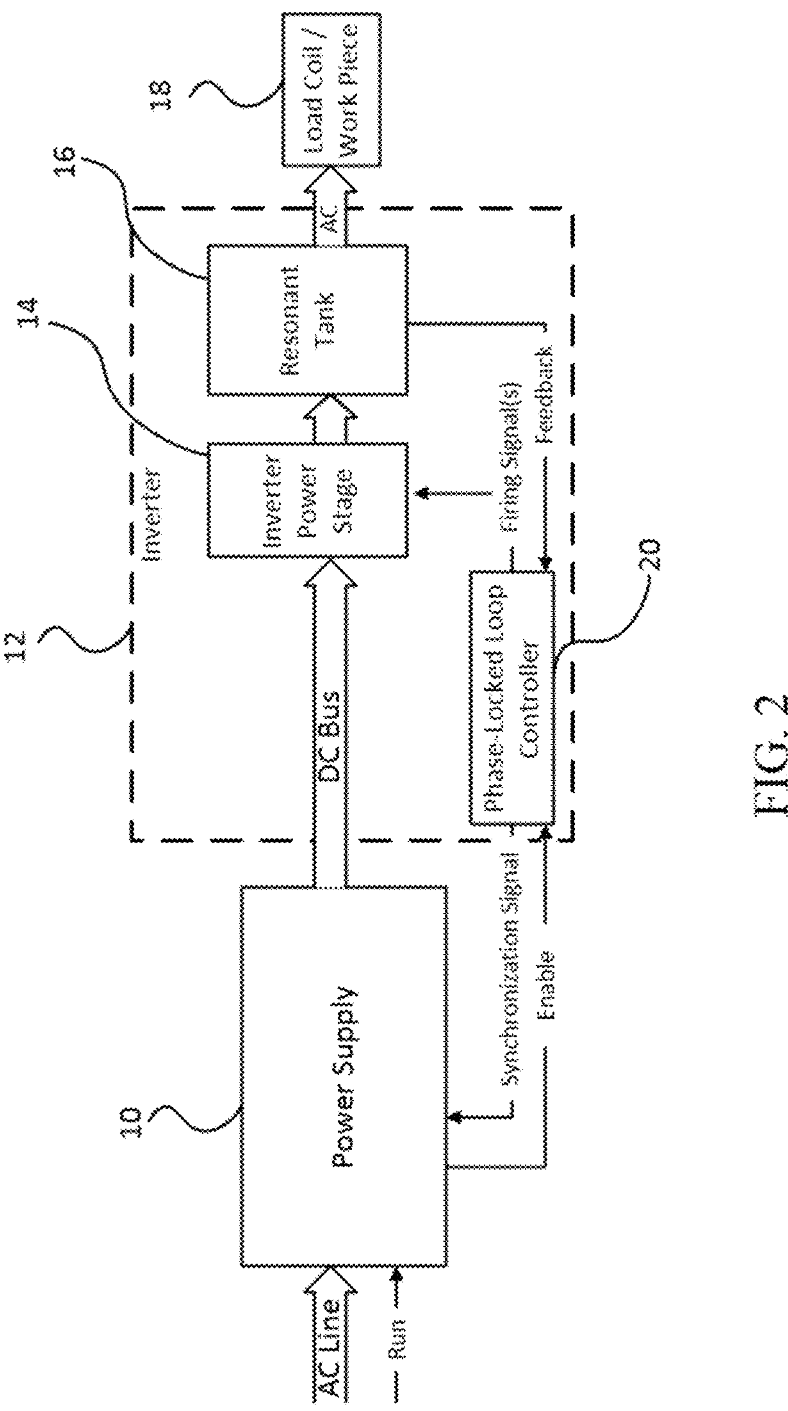
FIG. 2 illustrates a simplified diagram of an induction heating system utilizing a high frequency inverter control system defining the induction heating control system of the present invention.

FIG. 2 illustrates one example of the induction heating system implementing the high frequency inverter control system of the present invention. The induction heating control system comprises a power supply 10 feeding an inverter 12, which in turn feeds a load coil 18 to induce an electrical current in a workpiece. The power supply 10 receives an AC line input voltage and produces a DC output voltage, the DC output voltage further supplied to the inverter 12. When not actively executing the initialization process of the present invention, the power supply 10 produces an idle DC power level. The inverter 12 includes an inverter power stage 14, a resonant tank section 16, and a PLL (phase-locked loop) controller 20. The power supply 10 sends an enable signal to the PLL controller 20 to activate the PLL controller 20, executing a PLL algorithm as further described elsewhere herein. The inverter power stage 14 accepts the DC output voltage and produces a high frequency AC voltage, which is transmitted to the resonant tank section 16. The resonant tank section 16 comprises one or more capacitors and, in combination with the load coil 18 and the associated workpiece (together referred to as the load), forms a resonant circuit having a resonant frequency. In some embodiments, the resonant tank section 16 further comprises one or more inductors. When operating at the resonant frequency, efficiency and power output to the load coil 18 is maximized.

The PLL controller 20 executes a PLL algorithm configured to synchronize the high frequency AC voltage output by the inverter power stage to the resonant frequency of the resonant circuit. The PLL controller 20 receives a feedback signal from the resonant tank section 14, the feedback signal comprising the voltage signal of the resonant circuit. The PLL controller 20 then compares the phase of the voltage from the resonant tank section 14 to the phase of the current in the resonant tank section 14 and sends firing signals to the inverter power stage 12 comprising timing waveforms to adjust the phase and frequency of the high frequency AC voltage produced by the inverter power stage 12. When the feedback signal indicates that the voltage and current are in phase, the PLL controller 20 sends a synchronization signal to the power supply 10.

Figure 3A:
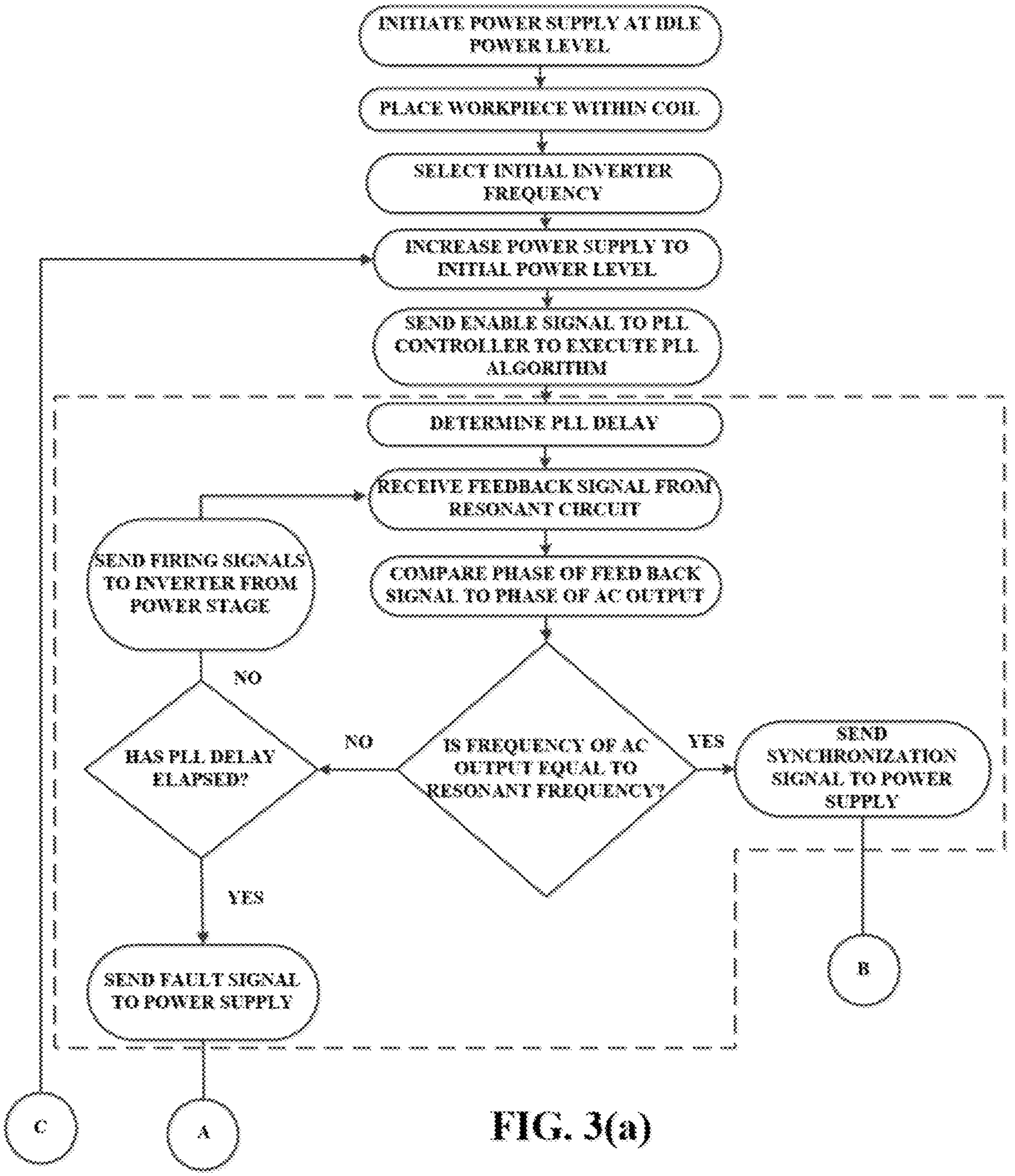
FIG. 3(*a*) illustrates a partial flow diagram representative of one embodiment of the high-frequency inverter initialization process for induction heating applications.
Figure 3B:
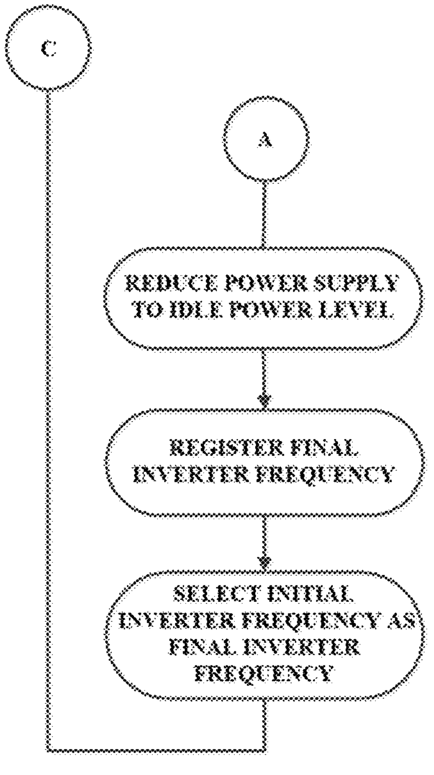
Figure 3B:
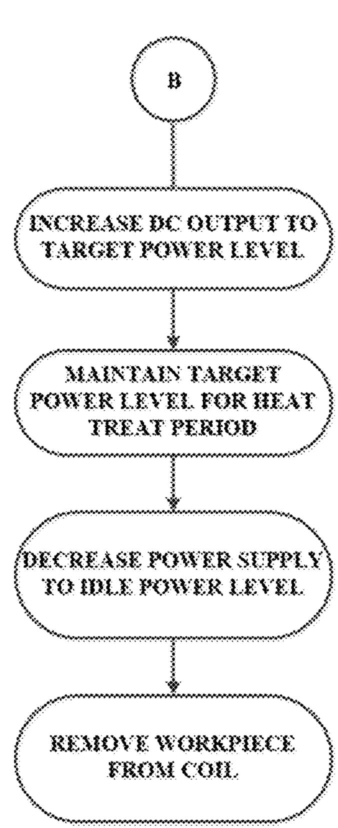

As best illustrated in FIGS. 3(*a*) and 3(*b*), initially, a workpiece is placed within the work coil 18 to be heated by the induction heating system. An initial inverter frequency is selected, wherein the initial inverter frequency represents a value approximately equivalent to an expected resonant frequency of the resonant circuit. In this manner, the time required to synchronize to the actual resonant frequency is minimized. Variation in the resonant frequency of the resonant circuit arises as sample-to-sample differences in each discrete workpiece impact the resonant frequency. Therefore, the initial inverter frequency is selected as an expected resonant frequency of the resonant circuit. The expected resonant frequency can be determined analytically or empirically using known parameters of the workpiece and the inverter topology. For example, typical resonant frequencies for workpieces of various shapes, sizes, and materials may be tabulated in and selected from a look-up table.

The power supply is then activated at an initial power level, wherein the initial power level is substantially lower than a target power level for the induction heating process. The target power level is the power level necessary to properly heat the workpiece for the desired induction heating application. For example, if the power supply must operate at a 90% power level to heat treat the workpiece, the initial power level may be selected as 6%. The initial power level must be set such that the switching transistors remain in their safe operating area and operate at safe temperatures. This will vary between systems. In general, the minimum power level depends on the feedback signals used to operate the PLL. The ultimate determinant of minimum level is the noise floor of this measurement, which is due to intrinsic noise sources in the circuitry such as thermal noise and shot noise as well as extrinsic signals such as induced voltage and current as well as common mode noise that is difficult to model or predict. In one embodiment, the initial power level is minimized just enough to avoid impacting the heating application but no further, as further reducing the feedback signal reduces the accuracy of the PLL with no benefit to the application. Therefore, in such embodiments, the initial power level is bounded between a range of potential power levels, wherein a lower bound of the initial power level is defined as a minimum power level sufficient to overcome the noise floor of the feedback signals, and wherein an upper bound of the initial power level is defined as a maximum power level before the workpiece is appreciably inductively heated as a result of the power level being inverted and provided to the work coil. In one embodiment, the initial power level is defined such that over the course of operation, the energy delivered during period of operation at the initial power level is less than 5% of the energy delivered to the workpiece at the target power level. In other words, the initial power may be determined by the following equation:

$$P_{init} \leq \frac{0.05(P_{tar} * f_{tar})}{t_{init}}$$

where $P_{init}$ represents the initial power level, $P_{tar}$ represents the target power level, $t_{tar}$ represents the time spent at the target power level to heat treat the workpiece, and $t_{init}$ represents the time spent at the initial power level while the PLL locks onto the resonant frequency, elsewhere described herein as the PLL delay. This initial power level relationship can further be used to define the upper bound of the acceptable initial power level range as previously described. As workpiece heating tolerances change, the percentage of energy used to determine the initial power level may be adjusted to suit the particular workpiece.

As the load characteristics of the resonant circuit operating outside of the resonant frequency are undesirable, the power level supplied is maintained at the initial power level until the power supplied to the load coil is at the resonant frequency. In this manner, inefficiencies in heat treatment of the workpiece can be minimized.

As the AC line input voltage period is substantial, for example 3-20 milliseconds for three phase 60 Hz systems and single-phase 50 Hz systems, respectively, relative to the desired ramp time, a delay (power supply delay) before reaching the initial power level is present. At the minimum, a delay on the order of a single line input period (divided by 6 for 3 phase systems) cannot be avoided, but at the maximum it may take several such periods because of the control loop response of a line-frequency phase-control system, which will typically be slower than a line period. During this time, prior to achieving the initial power level, insufficient feedback from the resonant tank is present in the inverter system to drive the PLL algorithm, and as such, the PLL controller is inactive during this time. Alternatively, a high-frequency power supply may be used to reduce this time, which will typically have higher control-loop bandwidth and therefore faster response time. In one embodiment, a high-frequency power supply operates at 100 kHz rather than at line frequency and can ramp to full power in less than 2 milliseconds. Regardless, the design of the complete system must take this ramp-up time into account.

Once the power supply is producing the initial power level, sufficient feedback signals are generated by the resonant circuit and transmitted to the PLL controller to initiate the PLL algorithm, represented in FIG. 3(*a*) by the elements within the broken lines. The PLL algorithm measures and compares the phase of the voltage and the current in the resonant tank and sends firing signals to the inverter power stage, the firing signals comprising timing waveforms configured to adjust the frequency produced by the inverter power stage. This continues in an iterative process until the phase of the current and the voltage in the resonant tank are synchronized, such that the resonant circuit is operating at the resonant frequency. Utilizing a known dynamic response time of the PLL algorithm as a basis, an estimate of the amount of time that the PLL algorithm requires to regulate the frequency to the resonant frequency (PLL delay) can be determined. The PLL delay is measured empirically and depends partly on the specific aspects of the load and initial frequency. The PLL algorithm can be considered a discrete time-system with each period or half-period representing one measurement of the phase difference between the load current and voltage. A higher frequency allows one to design a faster (in absolute time) PLL control loop. The control loop, like other control loops, consists of an error amplifier with a certain compensation network that shapes its frequency response. Other, system-related considerations also help to shape the response, such as how much oscillation occurs around the setpoint, how tolerant the power electronics are of operation outside of resonance and other factors. In this manner, once this amount of time has elapsed, the operator is certain that the PLL has either regulated the frequency of the inverter to the resonant frequency or a fault has occurred. In one embodiment, the PLL controller is designed such that the PLL controller settles on the resonant frequency within 1 millisecond. Presuming a high-frequency system, as defined systems operating at greater than 100 kHz, 1 millisecond can comprise in excess of 100 cycles of the PLL.

Once the PLL controller indicates that the high-frequency AC output of the inverter power stage is at the resonant frequency of the resonant circuit, the PLL controller sends a synchronization signal to the power supply indicating that the resonant frequency has been achieved, at which point the power supply increases the power level from the initial power level to the target power level. The synchronization signal is sent based on the PLL error signal indicating that the system has reached the resonant frequency. If the synchronization signal is not activated within a set period of time after the power supply ramps-up to the initial power level (the PLL delay), a fault signal is sent to the power supply and the power supply will shut down or reduce its DC output to an idle state. Since little heat has been delivered during this time, as defined by the power limit and timeout period, no substantial change occurs to the workpiece. In some embodiments, the workpiece is retained within the work coil to go through another iteration of the initialization process, wherein the initial inverter frequency may further be adjusted to allow the PLL to lock into the resonant frequency of the resonant tank circuit within the PLL delay period. In the shown embodiment, a final inverter frequency during a previous iteration of the PLL algorithm is utilized as the initial inverter frequency for the subsequent iteration of the PLL algorithms. In alternate embodiments, the initial inverter frequency for the subsequent iteration of the PLL algorithm comprises a new expected resonant frequency guess, which may further be defined by an existing value in the lookup table, a value within a set range of the initial inverter frequency of the previous iteration, or another value manually input by the user. In this manner, the initialization process effectively locks onto the resonant frequency of the resonant circuit over multiple iterations of the PLL while being exposed only to a minimal power level insufficient to inductively heat the workpiece. As such, the overall length of time that the workpiece is inductively heated, and particularly the proportion of time heating at non-resonant frequencies, is minimized, thereby ensuring rapid heat treatment and precise control over heat distribution within the workpiece.

Figure 4:
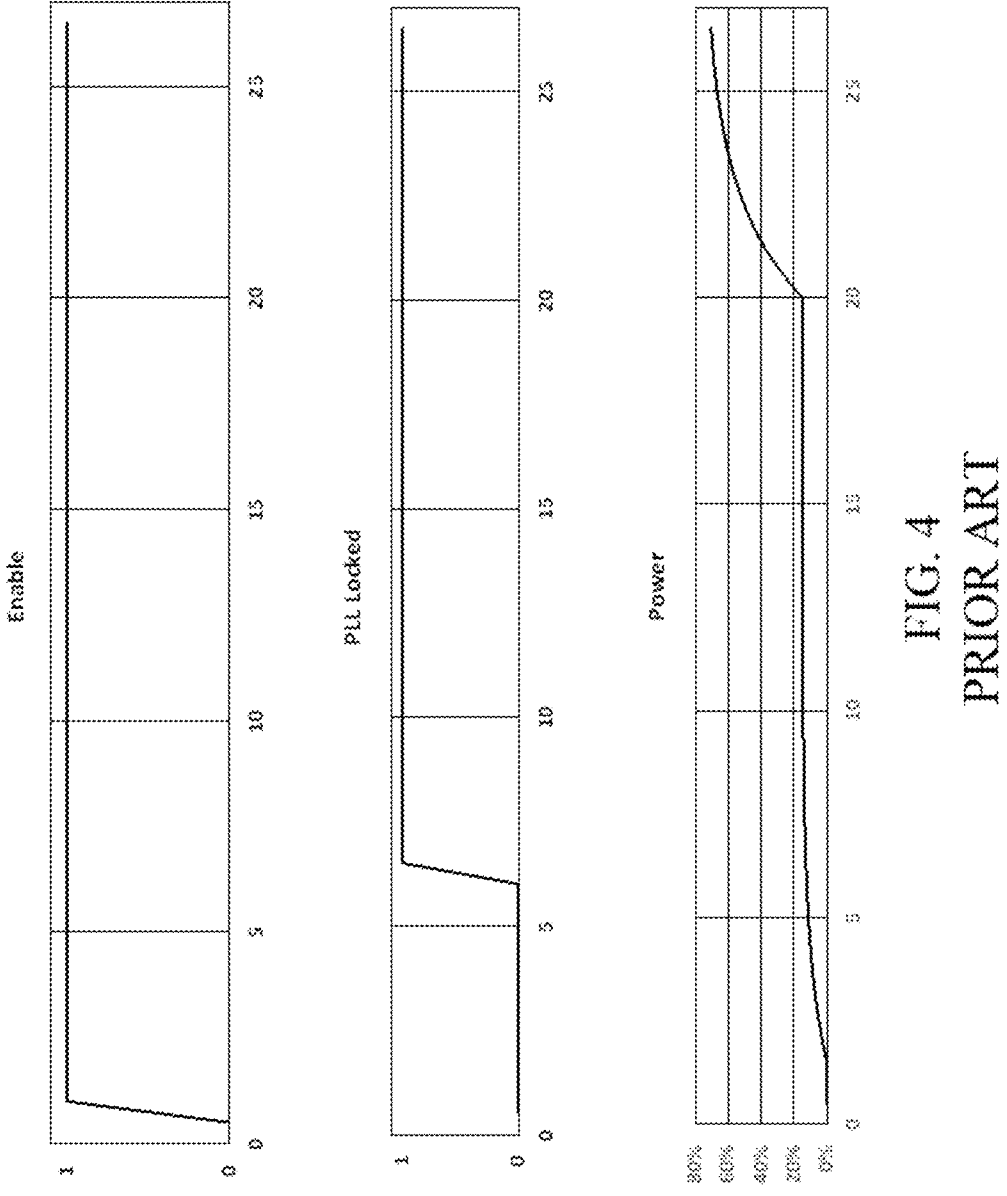
FIG. 4 illustrates an exemplary graph of the power initialization curve of a high frequency inverter of the prior art.

FIG. 4 illustrates an example of the power initialization curve of a typical high frequency inverter system over the course of an individual workpiece heat treatment process. As shown, after the system is enabled at an initial time, approximately shown as 1 millisecond in FIG. 4, a PLL delay of approximately 5 milliseconds occurs before locking onto the resonant frequency of the resonant circuit. Once locked, the power remains substantially idle at an initial low power level until gradually ramping up to full power at approximately 20 milliseconds.

Figure 5:
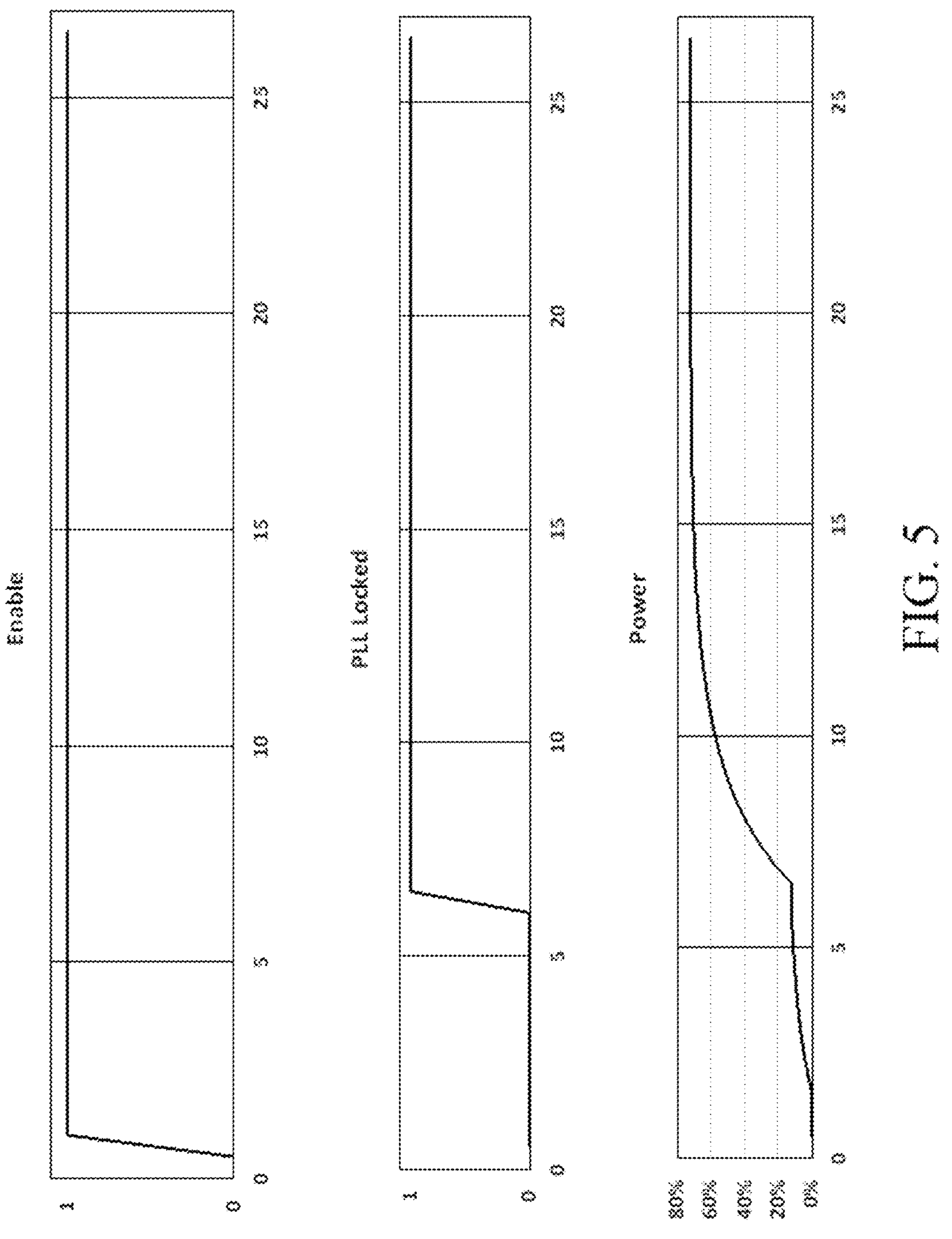
FIG. 5 illustrates an exemplary graph of the power initialization curve of a high frequency inverter of the present invention.

In the alternative, FIG. 5 illustrates an example of the power initialization curve of the rapid and precise high frequency inverter system of the present invention over the course of an individual workpiece heat treatment process. As shown, the system is enabled at an initial time, approximately shown as 1 millisecond in FIG. 5, a PLL delay of approximately 5 milliseconds occurs before locking onto the resonant frequency of the resonant circuit. As previously discussed, this PLL delay can be reduced by adjusting the parameters of the PLL controller, the circuit components, and the conditions of associated system. Once the system is locked to the resonant frequency, the power begins ramping up to the target power level within 1 millisecond. In this manner, the present system and process significantly reduces power supply delays, resulting in proportionally more time of the heating process spent at resonant frequency. As a result of adjustments to the PLL controller and the PLL response time, as well as adjustments to the power supply frequency, each of the PLL delay and the power supply ramp-up delay can be reduced to suit a particular application's needs.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. An induction heating control system for minimizing initialization time in a high-frequency inverter for controlling heat distribution within a workpiece, the induction heating control system comprising:

a power supply having an AC input adapted to be connected to a power source external to the induction heating control system, the power supply having a DC output configured to provide an initial DC output power level;

a high-frequency inverter operably connected to the DC output of the power supply, the high-frequency inverter comprising:

an inverter power stage adapted to receive the DC output and produce a high-frequency AC output at an initial inverter frequency;

a resonant tank section operably connected to the inverter power stage, the resonant tank section adapted to receive the high-frequency AC output;

wherein the resonant tank section includes one or more capacitors, defining a resonant circuit having a resonant frequency;

wherein the resonant circuit comprises the resonant tank section, an induction coil operably connected to the high-frequency inverter and configured to receive the high-frequency AC output, and the workpiece placed within the induction coil;

a phase locked loop controller in communication with each of the power supply, the inverter power stage, and the resonant tank section, the phase locked loop controller is configured to execute a frequency regulating algorithm comprising:

(a) receiving one or more feedback signals from the resonant tank section via one or more voltage sensors;

(b) comparing a phase of the one or more feedback signals to a phase of a current within the resonant tank section;

(c) sending firing signals comprising timing waveforms to the inverter power stage to adjust a phase and a frequency of the high-frequency AC output;

(d) repeating each of steps (a) through (c) until the frequency of the high-frequency AC output is equivalent to the resonant frequency of the resonant circuit; and (e) sending a synchronization signal to the power supply;

whereupon receipt of the synchronization signal, the power supply increases the DC output to a target DC output power level to distribute heat to the workpiece.

2. The system of claim 1, wherein the high-frequency inverter operates at frequencies greater than 100 kHz.

3. The system of claim 1, wherein the initial DC output power level comprises a power level less than 25% of the target DC output power level.

4. The system of claim 1, wherein the initial DC output power level is selected to comprise a minimum power level necessary for the phase locked loop controller to receive the one or more feedback signals from the resonant tank section.

5. The system of claim 4, wherein the minimum power level is selected from a range of power levels between a lower bound power level defined as a power level minimally exceeding a noise floor of the one or more feedback signals and an upper bound power level defined as a power level immediately preceding a power level sufficient to inductively heat the workpiece.

6. The system of claim 1, wherein an initial energy delivered to the workpiece while at the initial DC output power level comprises less than 5% of a target energy delivered to the workpiece while at the target DC output power level.

7. The system of claim 1, wherein the initial inverter frequency is selected from one or more known resonant frequencies for similar workpiece geometry and inverter topology tabulated in a lookup table.

8. The system of claim 1, wherein the power supply comprises a high-frequency power supply operating at frequencies greater than 100 kHz, such that a ramp-up time from the initial DC output power level to the target DC output power level is minimized.

9. The system of claim 1, wherein the phase locked loop controller further determines a phase locked loop delay representing a maximum time to regulate the high-frequency AC output to the resonant frequency utilizing a known dynamic response time of the frequency regulating algorithm.

10. The system of claim 9, wherein the synchronization signal is sent to the power supply after the phase locked loop delay has elapsed and the frequency of the high-frequency AC output is equivalent to the resonant frequency of the resonant circuit.

11. The system of claim 9, wherein a fault signal is sent to the power supply after the phase locked loop delay has elapsed and the frequency of the high-frequency AC output is not equivalent to the resonant frequency.

12. The system of claim 11, whereupon receipt of the fault signal, the power supply reverts to an idle DC output power level, wherein the idle DC output power level is less than the initial DC output power level.

13. The system of claim 12, wherein the frequency regulating algorithm is reinitiated after the fault signal is sent to the power supply utilizing a subsequent initial inverter frequency equivalent to a final inverter frequency, the final inverter frequency comprising an inverter frequency during a final cycle of a previous iteration of the frequency regulating algorithm.

14. The system of claim 1, wherein the resonant tank section further comprises one or more inductors.

15. A method for minimizing initialization time in a high-frequency inverter for controlling heat distribution within a workpiece in induction heating applications, comprising:

initiating a power supply having a DC output and operably connected to the high-frequency inverter into an idle state wherein the power supply outputs an idle DC power level;

placing the workpiece within an induction coil operably connected to the high-frequency inverter, the induction coil configured to receive a high-frequency AC output from an inverter power stage of the high-frequency inverter and filtered through a resonant tank section of the high-frequency inverter to inductively heat the workpiece;

selecting an initial inverter frequency of a high-frequency AC output, the initial inverter frequency comprising an expected resonant frequency for a combination of the workpiece and a topology of a resonant circuit defined by the resonant tank section, the induction coil, and the workpiece;

increasing the DC output produced by the power supply to an initial DC power level;

sending an enable signal from the power supply to a phase locked loop controller disposed in the high-frequency inverter, whereupon the phase locked loop controller executes a frequency regulating algorithm comprising:

(a) receiving one or more feedback signals from the resonant tank section of the high-frequency inverter, wherein the resonant circuit is defined by the resonant tank section in combination with the induction coil and the workpiece comprises a resonant frequency;

(b) comparing a phase of the one or more feedback signals to a phase of the high-frequency AC output;

(c) sending firing signals comprising timing waveforms to an inverter power stage disposed within the high-frequency inverter to adjust a phase and a frequency of the high-frequency AC output;

(d) repeating each of steps (a) through (c) until the frequency of the high-frequency AC output is equivalent to the resonant frequency of the resonant circuit; and (e) sending a synchronization signal to the power supply;

increasing the initial DC power level to a target DC power level upon receipt of the synchronization signal;

maintaining the target DC power level for a heat treatment period;

decreasing the target DC power level to the idle DC power level; and removing the workpiece from the induction coil.

16. The method of claim 15, further comprising the step of selecting the initial DC power level to minimally exceed a noise floor of the one or more feedback signals, such that the initial DC power level is minimized to avoid imparting measurable heat to the workpiece during execution of the frequency regulating algorithm.

17. The method of claim 15, wherein the frequency regulating algorithm executed by the phase locked loop controller further comprises the step of determining a phase locked loop delay representing a maximum time to regulate the high-frequency AC output to the resonant frequency utilizing a known dynamic response time of the frequency regulating algorithm, whereupon the repeating step is repeated until one of: the frequency of the high-frequency AC output is equivalent to the resonant frequency of the resonant circuit and the phase locked loop delay has elapsed.

18. The method of claim 17, wherein the frequency regulating algorithm further comprises the steps of sending a fault signal to the power supply when the frequency of the high-frequency AC output is not equivalent to the resonant frequency after the phase locked loop delay has elapsed.

19. The method of claim 18, further comprising the steps of:

reducing the DC output to the idle DC power level upon receipt of the fault signal; and retaining the workpiece within the induction coil.

20. The method of claim 19, further comprising the steps of:

registering a final inverter frequency, the final inverter frequency comprising the high-frequency AC output when the phase locked loop delay elapsed;

selecting the final inverter frequency as the high-frequency AC output as the initial inverter frequency for a subsequent iteration of the frequency regulating algorithm;

increasing the DC output produced by the power supply to the initial DC power level;

executing the frequency regulating algorithm;

repeating the registering through executing steps until the synchronization signal is sent to the power supply.

* * * * *